(12) United States Patent
Li et al.

(10) Patent No.: US 11,625,399 B2
(45) Date of Patent: Apr. 11, 2023

(54) METHODS AND DEVICES FOR DYNAMIC FILTER PUSHDOWN FOR MASSIVE PARALLEL PROCESSING DATABASES ON CLOUD

(71) Applicant: ALIBABA GROUP HOLDING LIMITED, Grand Cayman (KY)

(72) Inventors: Huaizhi Li, San Mateo, CA (US);
Congnan Luo, San Mateo, CA (US);
Ruiping Li, San Mateo, CA (US);
Xiaowei Zhu, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 395 days.

(21) Appl. No.: 16/414,218

(22) Filed: May 16, 2019

(65) Prior Publication Data
US 2020/0364226 A1 Nov. 19, 2020

(51) Int. Cl.
*G06F 16/00* (2019.01)
*G06F 16/2453* (2019.01)
*G06F 16/2458* (2019.01)
*G06F 16/22* (2019.01)
*G06F 16/9035* (2019.01)
*G06F 16/9536* (2019.01)

(52) U.S. Cl.
CPC .... *G06F 16/24545* (2019.01); *G06F 16/2255* (2019.01); *G06F 16/2462* (2019.01); *G06F 16/9035* (2019.01); *G06F 16/9536* (2019.01)

(58) Field of Classification Search
CPC .................................................. G06F 16/9536
See application file for complete search history.

(56) References Cited

U.S. PATENT DOCUMENTS

2009/0055362 A1* 2/2009 Huang ................ G06F 16/2452
2014/0164357 A1* 6/2014 Collins ............. G06F 16/24534
707/719

* cited by examiner

*Primary Examiner* — Ajith Jacob
(74) *Attorney, Agent, or Firm* — Finnegan, Henderson, Farabow, Garrett & Dunner, LLP (57) ABSTRACT

A method for dynamic filter pushdown for massive parallel processing databases on the cloud, including acquiring one or more filters corresponding to a query, acquiring statistics information of one or more database tables, determining a selectivity of the one or more database tables based on the statistics information, determining whether the selectivity satisfies a threshold condition, and pushing down the one or more filters to the one or more database tables based on the determination of whether the selectivity satisfies a threshold condition.

19 Claims, 7 Drawing Sheets

METHODS AND DEVICES FOR DYNAMIC FILTER PUSHDOWN FOR MASSIVE PARALLEL PROCESSING DATABASES ON CLOUD

BACKGROUND

Increasing the sizes of database and allowing for big data analysis is unlocking the potential of data. Many companies have developed database scanning techniques that allow for quicker and less computationally intensive scanning of large amounts of data. The inaccuracy of current selectivity estimations, however, may lead to unnecessary processing, decreased efficiency, and increases computational times.

Additionally, the lack of support for different storage types in hash join and semi-join operations leads to an inability to perform these operations on large numbers of databases which may have various different storage types.

Furthermore, the lack of an effective scheme for dynamically pushing down filters causes redundancy and unnecessary computation, leading to decreased efficiency and increased computational times.

SUMMARY

The present disclosure provides a method for dynamic filter pushdown for massive parallel processing databases on the cloud. The method includes acquiring one or more filters corresponding to a query, acquiring statistics information of one or more database tables, determining a selectivity of the one or more database tables based on the statistics information, determining whether the selectivity satisfies a threshold condition, and pushing down the one or more filters to the one or more database tables based on the determination of whether the selectivity satisfies a threshold condition.

Consistent with some embodiments, the present disclosure also provides a device. The device includes a memory configured to store a set of instructions and a processor configured to execute the set of instructions to cause the device to acquire one or more filters corresponding to a query, acquire statistics information of one or more database tables, determine a selectivity of the one or more database tables based on the statistics information, determine whether the selectivity satisfies a threshold condition, and push down the one or more filters to the one or more database tables based on the determination of whether the selectivity satisfies a threshold condition.

Consistent with some embodiments, the present disclosure also provides a database system. The database system includes at least one front node configured to receive one or more query associated with one or more filters and at least one compute node coupled to the at least one front node, the at least one compute node configured to acquire one or more filters corresponding to a query, acquire statistics information of one or more database tables, determine a selectivity of the one or more database tables based on the statistics information, determine whether the selectivity satisfies a threshold condition, and push down the one or more filters to the one or more database tables based on the determination of whether the selectivity satisfies a threshold condition.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
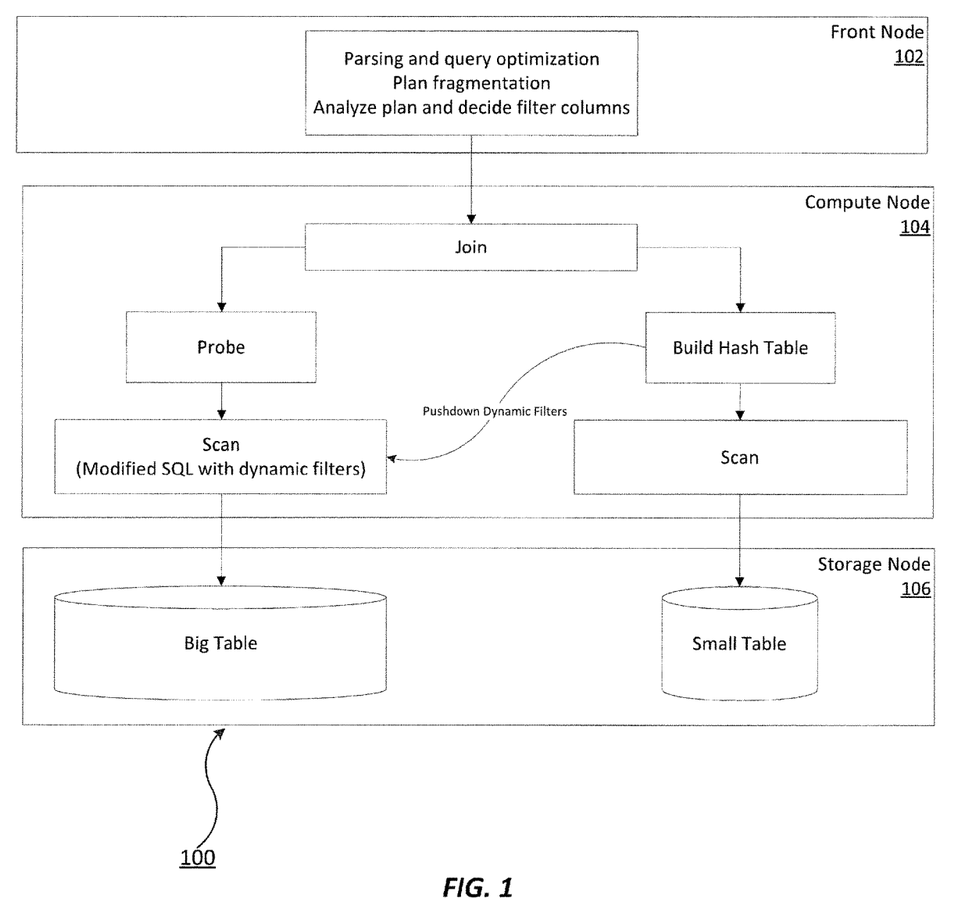
FIG. 1 illustrates a block diagram of a conventional mechanism for dynamic filter pushdown.

FIG. 1 illustrates a block diagram of a conventional mechanism for dynamic filter pushdown 100. As shown in FIG. 1, conventional mechanisms for dynamic filter pushdown include a front node 102, a compute node 104, and a storage node 106.

As show in FIG. 1, many conventional mechanisms include a front node 102 that performs parsing and query optimization based on a received query from a client device. Additionally, front node 102 performs plan fragmentation, analyzes the plan, and decides filter columns based on the query. Statistical information relating to the database tables involved in the operations is utilized in front node 102 rather than the compute node 104. This leads to less accurate selectivity estimations and lower quality dynamic filters. Consequently, the servers implementing these mechanisms suffer heightened input/output costs, decreased efficiency, and high computational times.

As shown in FIG. 1, conventional mechanisms for dynamic filter pushdown include compute node 104. For a join operation, during the building of the hash table from the small table, filters are collected based on the join predicates.

Afterwards, before probing the big table, the filters collected based on the join predicates are pushed down to the scanning of the big table. During the scanning of the big table, all partitions of the big table are scanned. By not removing the partitions of the big table that do not correspond with a dynamic filter, the servers implementing these mechanisms suffer heightened input/output costs, decreased efficiency, and high computational times.

As shown in FIG. 1, conventional mechanisms for dynamic filter pushdown include storage node 106 having a big table and a small table. For a join operator, a big table is defined as the table with the larger size based on the number of rows and columns from each table that are part of the result set. Similarly, a small table is defined as the table with the smaller size based on the number of rows and columns from each table that are part of the result set. In conventional mechanisms, only one default storage type is used for the database tables. This leads to an inability to perform hash join and semi join operations on database tables of different storage types.

Embodiments of the present disclosure are directed to methods and devices for dynamic filter pushdown for massive parallel processing databases on cloud. For example and without limitation, embodiments of the present disclosure use statistical information at the compute node to determine selectivity of the big table and thus whether to pushdown dynamic filters. Additionally, embodiments of the present disclosure support various heterogeneous storage types for pushing down dynamic filters. Furthermore, embodiments of the present disclosure allow for partitioning of the dynamic filters based on the partition scheme of the big table and pruning the partitions of the big table that do not correspond with any dynamic filters.

Figure 2:
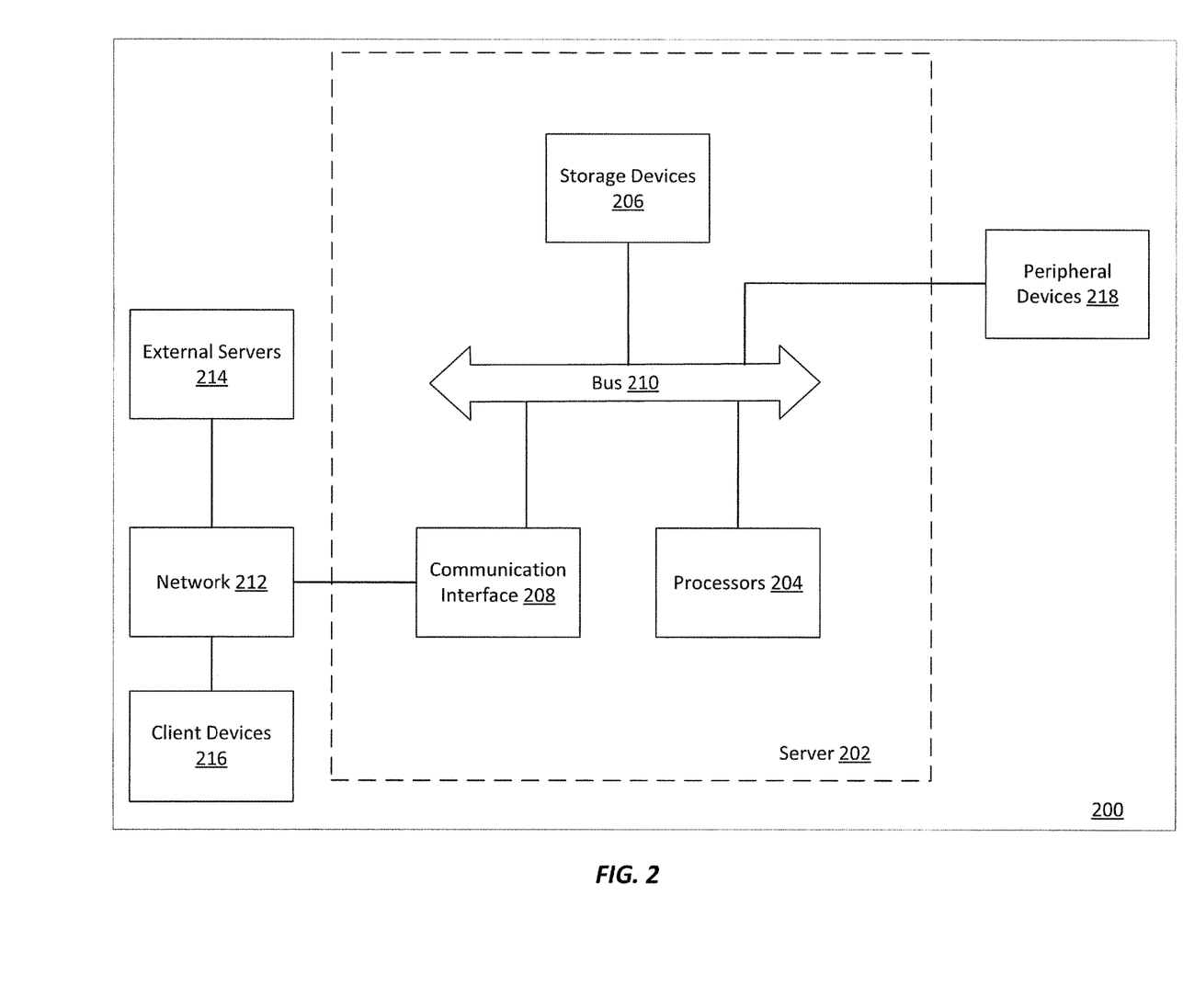
FIG. 2 illustrates a block diagram of an exemplary system environment, consistent with some embodiments of the disclosure.

FIG. 2 illustrates a block diagram of an exemplary system for dynamic filter pushdown for massive parallel processing databases on cloud 200, according to embodiments of the disclosure. Dynamic filter pushdown system 200 may include a server 202, network 212, external server 214, client devices 216, and peripheral devices 218.

As illustrated in FIG. 2, server 202 may be connected to network 212 through a communication interface 208. In some embodiments, server 202 may be connected to client devices 216 and one or more external servers 214 through network 212. Additionally, in some embodiments, server 202 may be connected to peripheral devices 218 through bus 210.

Figure 3:
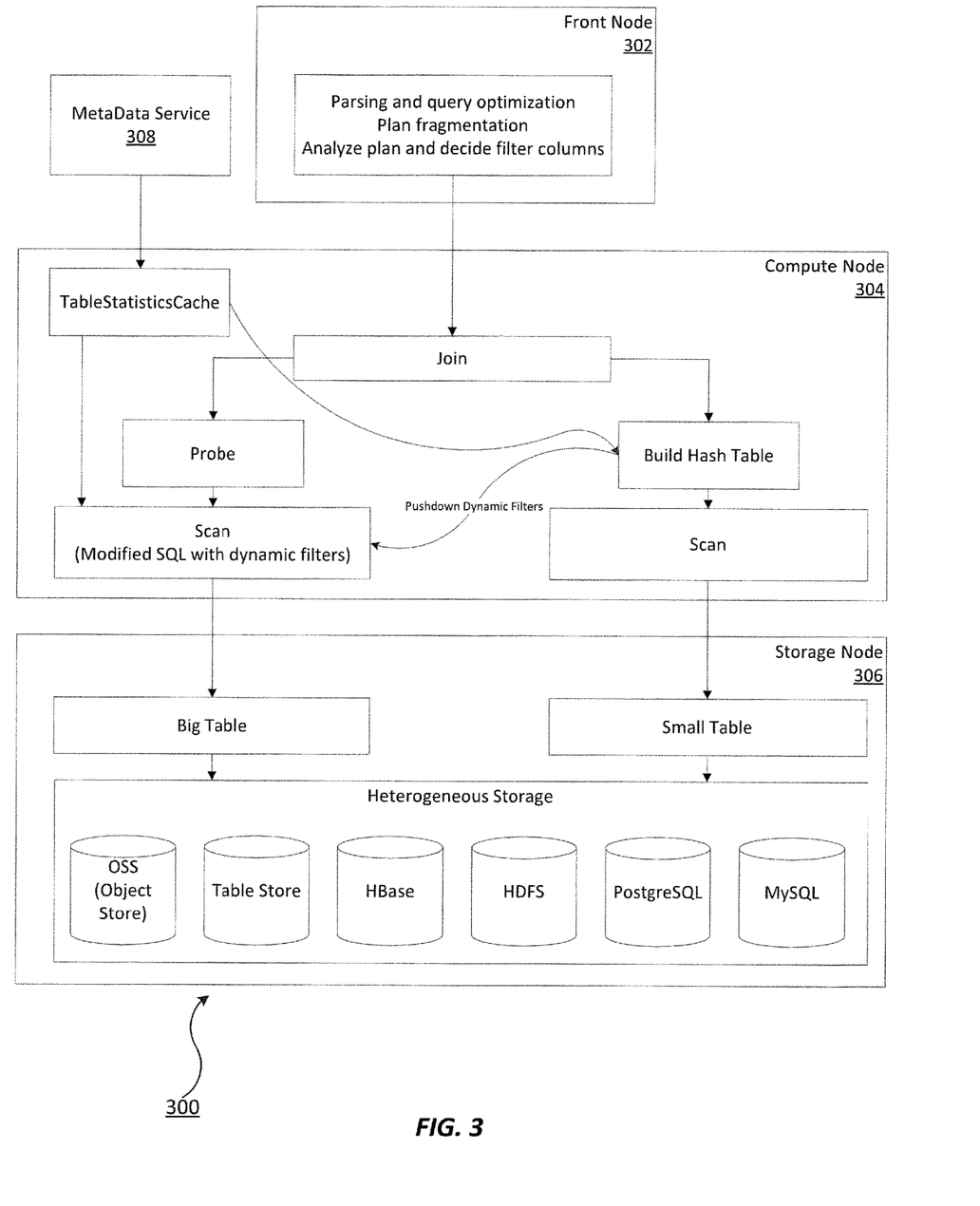
FIG. 3 illustrates a block diagram of an exemplary mechanism for dynamic filter pushdown for massive parallel processing databases on cloud, consistent with some embodiments of this disclosure.

FIG. 3 illustrates a block diagram of an exemplary mechanism for dynamic filter pushdown for massive parallel processing databases on cloud 300, consistent with some embodiments of this disclosure. As shown in FIG. 3, the exemplary mechanism may include a front node 302, a compute node 304, a storage node 306, and a MetaData Service module 308. Front node 302 and compute node 304 may be implemented on a server, e.g. server 202. In some embodiments, only compute node 304 is implemented on a single server (e.g. server 202) and front node 302 may be implemented elsewhere, such as one of the one or more external servers 214.

As shown in FIG. 3, front node 302 performs parsing and query optimization and plan fragmentation. Additionally, front node 302 analyzes the plan and decides filter columns based on the query.

As shown in FIG. 3, MetaData Service module 308 obtains and periodically updates statistics information of the database tables. In some embodiments, statistics information may include how many distinct values are in each table and how many rows of each table satisfy the criteria of the query.

In some embodiments, the MetaData Service module 308 collects statistics information for different columns of each table.

As shown in FIG. 3, compute node 304 contains a TableStatisticsCache. The TableStatisticsCache caches statistics information of the database tables. The TableStatisticsCache caches the statistics information that is obtained and periodically updated by the MetaData Service module 308. In some embodiments, TableStatisticsCache maintains a histogram corresponding with the statistics information obtained and periodically updated by the MetaData Service module 308.

As shown in FIG. 3, storage node 306 contains a big table and a small table, which may be stored on various types of heterogeneous storage types, such as OSS, Table Store, HBase, HDFS, PostgreSQL, MySQL, and others. According to the mechanism disclosed above, the compute node 304 may pushdown the dynamic filters to the storage node 306 through different methods depending on the storage type of the big table. For example, for MySQL and PostgreSQL, the dynamic filters may be pushed down using SQL with in list. Additionally, for HBase, OSS, and TableStore, the dynamic filters may be pushed down using the appropriate application programming interface (API) such as HBase API, SelectObject API, or TableStore API. In some embodiments, other methods of pushing down the dynamic filters are used based on the intended storage type of the big table. Because the dynamic filters are pushed down, fewer tuples are fetched from storage node 306 and the input/output cost of fetching is therefore reduced.

In some embodiments, for a join or semi join operation, during the building of the hash table from the small table, dynamic filters are collected based on the join predicates. Afterwards, the selectivity of the big table is calculated based on the dynamic filters and the statistics information. In some embodiments, the selectivity of the big table may be calculated by also using the histogram maintained by TableStatisticsCache.

In some embodiments, the dynamic filters are only pushed down to the scanning of the big table based on whether the selectivity of the big table satisfies a threshold condition. For example, if the selectivity of the big table is less than 20%, where 20% represents the percent of the big table to be read, then the dynamic filters are pushed down to the scanning of the big table. If the selectivity of the big table is higher than 20%, however, then compute node 304 can continue with a regular hash join or semi join operation. Because the dynamic filters collected previously are accurate, the estimated selectivity is more precise.

In some embodiments, if it is determined that the selectivity of the big table satisfies the threshold condition and after the dynamic filters are pushed down to the scanning of the big table, compute node 304 probes the big table. This dynamic filter pushdown allows for even greater reduction in the input/output costs for fetching data from the big table than conventional methods.

Figure 4:
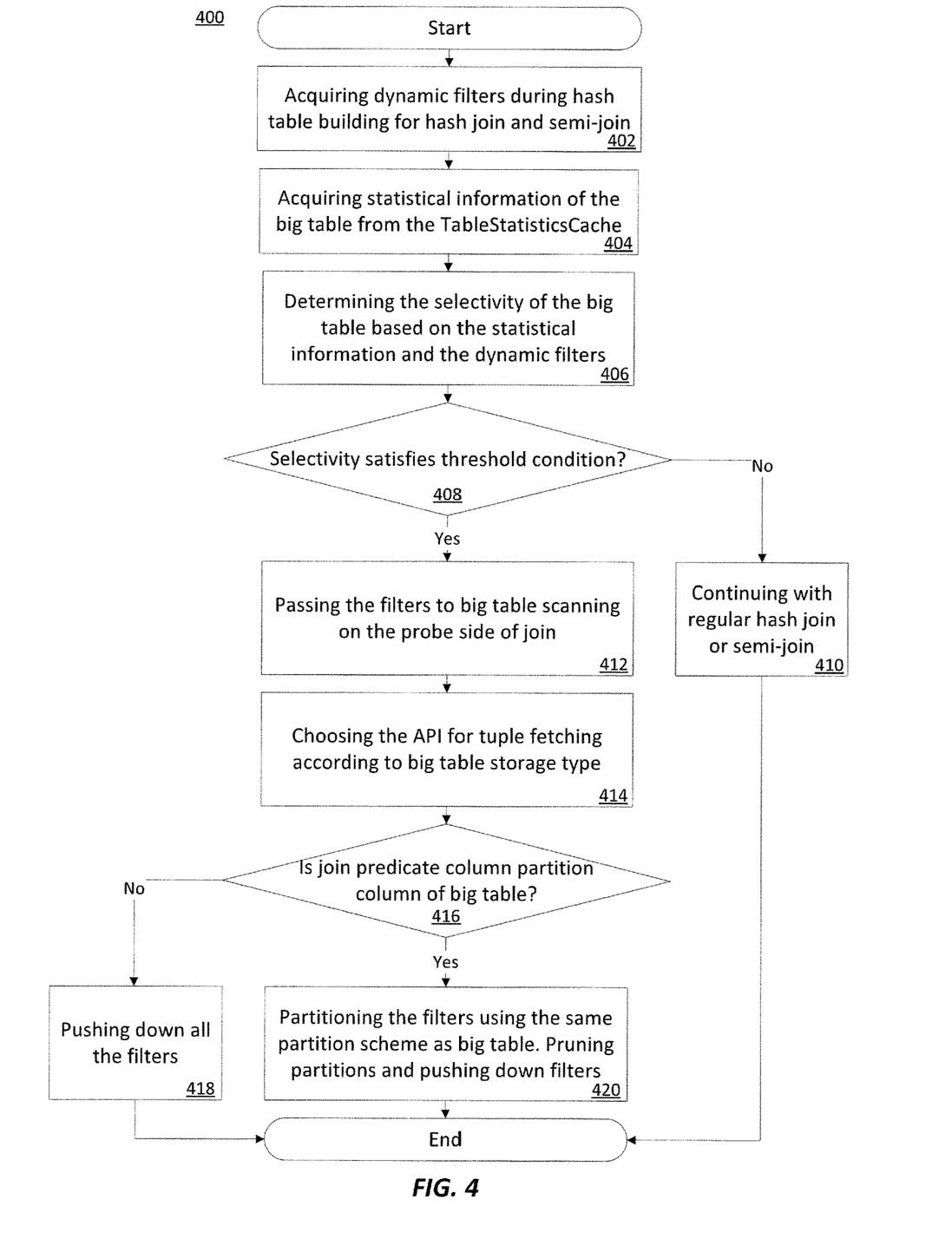
FIG. 4 is a flowchart of an exemplary method for dynamic filter pushdown, consistent with some embodiments of the disclosure.

FIG. 4 is a flowchart of an exemplary method 400 for dynamic filter pushdown for massive parallel processing databases on cloud, consistent with some embodiments of this disclosure. The exemplary method 400 may be performed by a server (e.g., server 202 of FIG. 2 or compute node 304 of FIG. 3).

In step 402, the server acquires dynamic filters during hash table building for a hash join or semi-join operation. For example, the server may collect dynamic filters based on the join predicate of the hash join or semi join operation. In some embodiments, the join predicate includes implied predicates derived from the initial query.

In step 404, the server acquires statistical information of the big table from the TableStatisticsCache. For example, the server may obtain a histogram of collected rows from the small table based on the statistics information obtained and periodically updated by the MetaDataService module of FIG. 3.

In step 406, the server determines the selectivity of the big table based on the statistical information and the dynamic filters. For example, the server may determine the percentage of the big table to be read for the present query based on the statistical information of the big table acquired in step 404 and the dynamic filters acquired in step 402.

In step 408, the server determines whether selectivity satisfies a threshold condition. For example, the server may determine whether the selectivity of the big table determined in step 406 is less than 20%, where 20% represents the percent of the big table to be read. In some embodiments, the threshold condition is prestored in memory, such as a configuration variable stored in one of the one or more storage devices 206 of FIG. 2. If the server determines that the selectivity does not satisfy the threshold condition, the server will then execute step 410, in which the server continues with a regular hash join or semi-join operation. For example, the server may not pushdown any dynamic filters and instead continue probing and then scanning the big table.

On the other hand, if the server determines that the selectivity satisfies the threshold condition, the server can then execute step 412. In step 412, the server passes the filters to big table scanning on the probe side of join. For example, the server may pushdown the dynamic filters from the small table to the big table in order to reduce the number of tuples fetched and thereby reduce input/output cost.

In step 414, the server chooses the API for tuple fetching according to big table storage type. For example, based on the different possible storage type options of the big table, the server can choose the API according to that storage type. In some embodiments, the server may not choose an API but rather determine to use SQL with in list for the dynamic filter pushdown.

In step 416, the server determines whether the join predicate column is a partition column of the big table. For example, the server may determine if the big table is partitioned on a column whose partition scheme can be hash partitioning or range partitioning. The server then determines whether the join predicate corresponds with the partitioned column. This step ensures that partitions that do not match the dynamic filters are not pushed down. If the server determines that the join predicate is not a partitioned column of the big table, the server will then execute step 418, in which the server pushes down all of the dynamic filters. For example, the server may pushdown the dynamic filters acquired in step 402 to the big table scanning on the probe side of join. This ensures that only the columns of the big table that correspond with the dynamic filters are scanned, thereby reducing input/output costs.

On the other hand, if the server determines that the join predicate is a partitioned column of the big table at step 416, the server can then execute step 420. In step 420, the server partitions the dynamic filters using the same partition scheme as the big table, prunes the big table partitions, and pushes down the dynamic filters. For example, the dynamic filters acquired in step 402 are partitioned using the same scheme as the big table. In some embodiments, the big table may be partitioned into different physical nodes where each physical node contains different rows. The dynamic filters would thereby be partitioned according to this same scheme. The server then prunes the big table partitions that do not correspond with any of the dynamic filters. Finally, the server pushes down the dynamic filters to the big table scanning on the probe side of join. By further reducing the amount of tuples scanned in the big table, the input/output cost of the entire hash join or semi-join operation is reduced.

Figure 5:
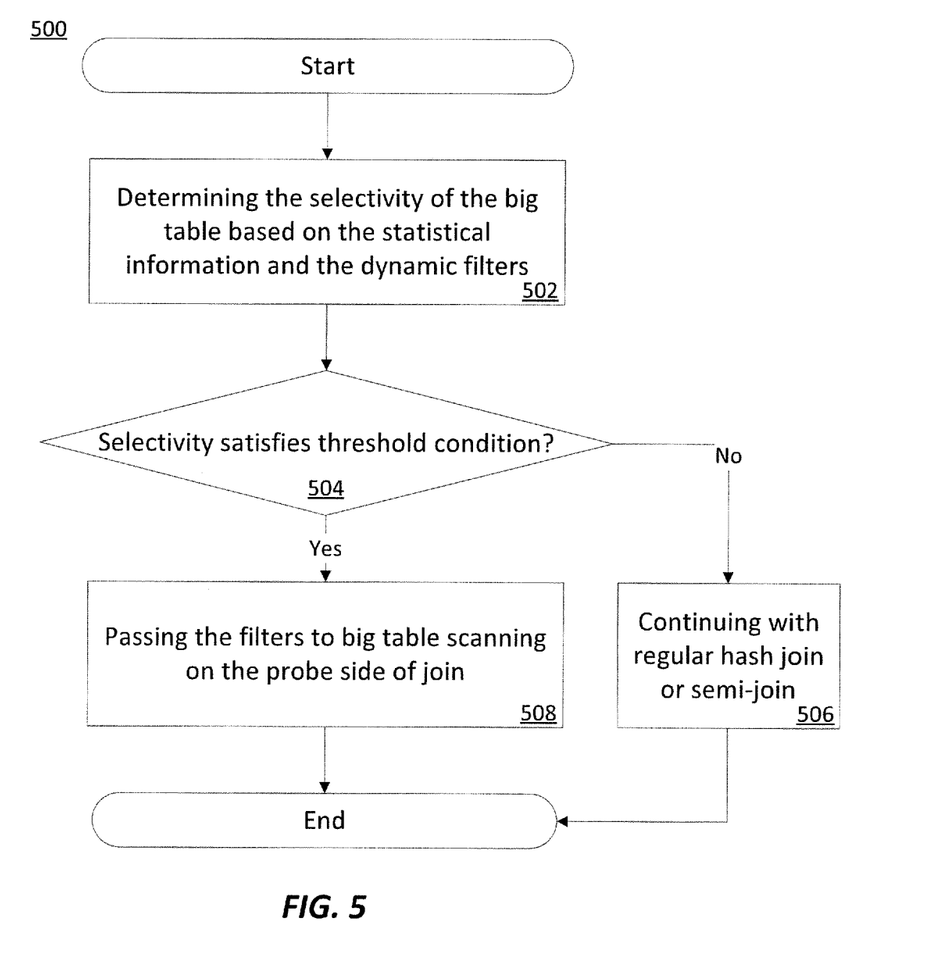
FIG. 5 is another flowchart of an exemplary method for dynamic filter pushdown, consistent with some embodiments of the disclosure.

FIG. 5 is a flowchart of an exemplary method 500 for determining the selectivity of the big table, consistent with some embodiments of this disclosure. The exemplary method 500 may be performed by a server (e.g., server 202 of FIG. 2 or compute node 304 of FIG. 3).

In step 502, the server determines the selectivity of the big table based on the statistical information and the dynamic filters. For example, the server may determine the percentage of the big table to be read for the present query based on the statistical information cached in the TableStatisticsCache of FIG. 3 and based on the dynamic filters acquired during the hash table building in computer node 304 of FIG. 3.

In step 504, the server determines whether selectivity satisfies a threshold condition. For example, the server may determine whether the selectivity of the big table determined in step 406 is less than 20%, where 20% represents the percent of the big table to be read. In some embodiments, the threshold condition is prestored in memory, such as a configuration variable stored in one of the one or more storage devices 206 of FIG. 2. If the server determines that the selectivity does not satisfy the threshold condition, the server can then execute step 506, in which the server continues with a regular hash join or semi-join operation. For example, the server may not pushdown any dynamic filters and instead continue probing and then scanning the big table.

On the other hand, if the server determines that the selectivity satisfies the threshold condition, the server can then execute step 508. In step 508, the server passes the filters to big table scanning on the probe side of join. For example, the server may pushdown the dynamic filters from the small table to the big table in order to reduce the number of tuples fetched and thereby reduce input/output cost.

Figure 6:
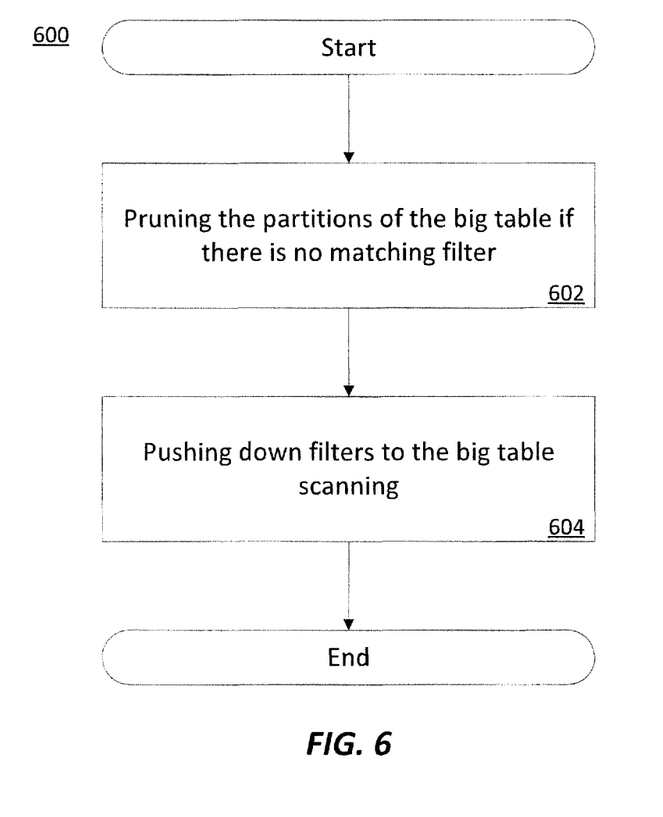
FIG. 6 is another flowchart of an exemplary method for dynamic filter pushdown, consistent with some embodiments of the disclosure.

FIG. 6 is a flowchart of an exemplary method 600 for dynamic filter pushdown for massive parallel processing databases on cloud, consistent with some embodiments of this disclosure. The exemplary method 600 may be performed by a server (e.g., server 202 of FIG. 2 or compute node 304 of FIG. 3).

In step 602, the server prunes partitions of the big table if there is no matching dynamic filter. For example, the server may determine whether big table is partitioned on a column, whose partition scheme may be hash partitioning or range partitioning. The server may then partition the dynamic filters according to the same partitioning scheme as the big table. If there is no matching dynamic filter for a given partition of the big table, then the server may prune that partition of the big table.

In step 604, the server pushes down the dynamic filters to the big table scanning. For example, the server may pushdown the dynamic filters acquired during the hash table building in computer node 304 of FIG. 3 to the big table scanning on the probe side of join.

Figure 7:
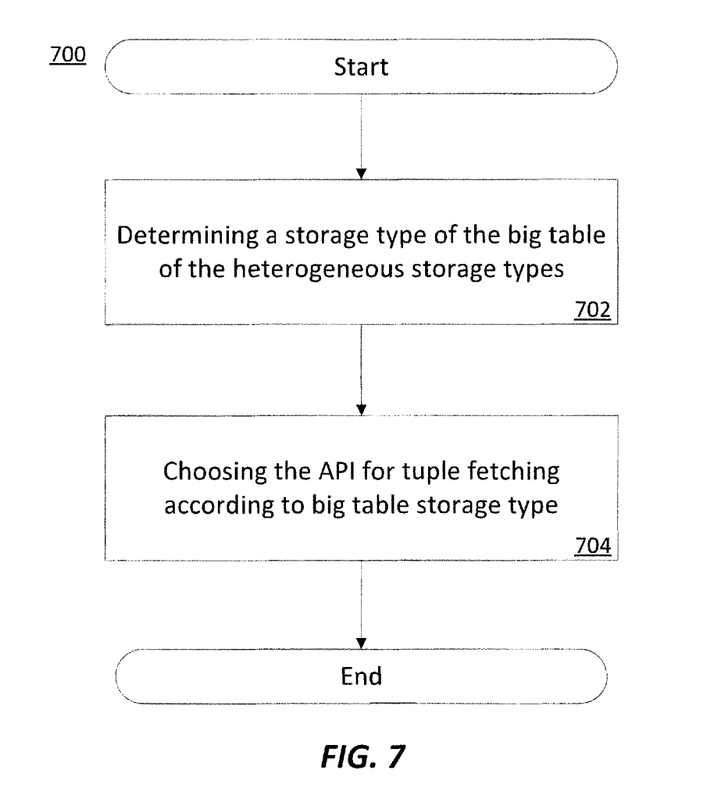
FIG. 7 is another flowchart of an exemplary method for dynamic filter pushdown, consistent with some embodiments of the disclosure.

FIG. 7 is a flowchart of an exemplary method 700 for determining the method for dynamic filter pushdown, consistent with some embodiments of this disclosure. The exemplary method 700 may be performed by a server (e.g., server 202 of FIG. 2 or compute node 304 of FIG. 3).

In step 702, the server determines a storage type of the big table of the heterogeneous storage types. For example, the big table may be stored on various different types of storages such as OSS, HBase, TableStore, PostgreSQL, and MySQL. The server may determine which of these storage types the big table is stored on.

In step 704, the server chooses the API for tuple fetching according to the storage type. For example, the server may determine the API for tuple fetching corresponding to the storage type of the big table determined in step 702. In some embodiments, such as when the storage type of the big table is MySQL or PostgreSQL, the server may use SQL with in list instead of an API for tuple fetching.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method comprising:
    acquiring one or more filters corresponding to a query;
    acquiring statistics information of one or more database tables;
    determining a selectivity of the one or more database tables based on the statistics information;
    determining whether the selectivity of the one or more database tables satisfies a threshold condition associated with the statistic information;
    determining whether to partition the one or more filters based on the query and the one or more database tables;
    partitioning the one or more filters based on the one or more database tables;
    pruning partitions of the one or more database tables based on the one or more partitioned filters; and
    pushing down the one or more partitioned filters to the one or more database tables based on the determination of whether the selectivity of the one or more database tables satisfies the threshold condition.

2. The method of claim 1, wherein the one or more database tables correspond with one of one or more heterogeneous storage types further comprising:
    determining a storage type of the one or more heterogeneous storage types based on the one or more database tables; and
    wherein pushing down the partitioned one or more filters to the one or more database tables is based on the determination of the storage type.

3. The method of claim 2, wherein pushing down the one or more partitioned filters to the one or more database tables includes pushing down the one of more partitioned filters using an application programming interface.

4. The method of claim 1, wherein the statistics information is periodically cached based on the one or more database tables before being acquired.

5. The method of claim 1, wherein the query includes a query for a join or semi-join operation.

6. The method of claim 1, wherein the one or more database tables includes a big table.

7. A device comprising:
    a memory configured to store a set of instructions; and
    a processor configured to execute the set of instructions to cause the device to:
        acquire one or more filters corresponding to a query;
        acquire statistics information of one or more database tables;
        determine a selectivity of the one or more database tables based on the statistics information;
        determine whether the selectivity of the one or more database tables satisfies a threshold condition associated with the statistic information;
        determine whether to partition the one or more filters based on the query and the one or more database tables;
        partition the one or more filters based on the one or more database tables;
        prune partitions of the one or more database tables based on the one or more partitioned filters; and
        push down the one or more partitioned filters to the one or more database tables based on the determination of whether the selectivity of the one or more database tables satisfies the threshold condition.

8. The device of claim 7, wherein the one or more database tables correspond with one of one or more heterogeneous storage types and wherein the processor is further configured to execute the set of instructions to cause the device to:
  determine a storage type of the one or more heterogeneous storage types based on the one or more database tables; and
  wherein the pushing down the one or more partitioned filters to the one or more database tables is based on the determination of the storage type.

9. The device of claim 8, wherein the pushing down the one or more partitioned filters to the one or more database tables includes pushing down the one of more partitioned filters using an application programming interface.

10. The device of claim 7, wherein the statistics information is periodically cached based on the one or more database tables before being acquired.

11. The device of claim 7, wherein the query includes a query for a join or semi-join operation.

12. The device of claim 7, wherein the one or more database tables includes a big table.

13. A database system, comprising:
  a first server having one or more processors and the first server is configured to implement at least one front node, the at least one front node configured to receive one or more query associated with one or more filters;
  a second server having one or more processors and the second server is configured to implement at least one compute node coupled to the at least one front node, the at least one compute node configured to:
  acquire one or more filters corresponding to a query;
  acquire statistics information of one or more database tables;
  determine a selectivity of the one or more database tables based on the statistics information;
  determine whether the selectivity of the one or more database tables satisfies a threshold condition associated with the statistic information;
  determine whether to partition the one or more filters based on the query and the one or more database tables;
  partition the one or more filters based on the one or more database tables;
  prune partitions of the one or more database tables based on the one or more partitioned filters; and
  push down the one or more partitioned filters to the one or more database tables based on the determination of whether the selectivity of the one or more database tables satisfies the threshold condition.

14. The database system according to claim 13, wherein the one or more database tables correspond with one of one or more heterogeneous storage types and wherein the compute node is further configured to:
  determine a storage type of the one or more heterogeneous storage types based on the one or more database tables; and
  wherein the pushing down the one or more partitioned filters to the one or more database tables is based on the determination of the storage type.

15. The database system according to claim 14, wherein the pushing down the one or more partitioned filters to the one or more database tables includes pushing down the one of more partitioned filters using an application programming interface.

16. The database system according to claim 13, wherein the statistics information is periodically cached based on the one or more database tables before being acquired.

17. The database system according to claim 13, wherein the query includes a query for a join or semi-join operation.

18. The database system according to claim 13, wherein the one or more database tables includes a big table.

19. The database system according to claim 13, wherein the first server and the second server is a same server.

* * * * *